US008661050B2

(12) United States Patent
Varshavsky et al.

(10) Patent No.: US 8,661,050 B2
(45) Date of Patent: Feb. 25, 2014

(54) HYBRID RECOMMENDATION SYSTEM (75) Inventors: Roy Varshavsky, Tel Aviv (IL); Moshe Tennenholtz, Haifa (IL); Ron Karidi, Herzeliya (IL)

(73) Assignee: Microsoft Corporation, Redmond, WA (US)

( * ) Notice: Subject to any disclaimer, the term of this patent is extended or adjusted under 35 U.S.C. 154(b) by 652 days.

(21) Appl. No.: 12/500,657

(22) Filed: Jul. 10, 2009

(65) Prior Publication Data

US 2011/0010366 A1 Jan. 13, 2011

(51) Int. Cl.
*G06F 17/30* (2006.01)
(52) U.S. Cl.
USPC .......................................................... 707/765
(58) Field of Classification Search
USPC .......................................................... 707/765
See application file for complete search history.

(56) References Cited

U.S. PATENT DOCUMENTS

| | | | |
|---|---|---|---|
| 6,801,909 B2 | 10/2004 | Delgado et al. | |
| 7,117,207 B1 | 10/2006 | Kerschberg et al. | |
| 7,328,216 B2 | 2/2008 | Hofmann et al. | |
| 7,991,841 B2 | 8/2011 | Anderson et al. | |
| 2002/0091820 A1 | 7/2002 | Hirai | |
| 2002/0174429 A1 | 11/2002 | Gutta et al. | |
| 2004/0054572 A1 | 3/2004 | Oldale et al. | |
| 2004/0207636 A1 | 10/2004 | Messer et al. | |
| 2005/0171955 A1 | 8/2005 | Hull et al. | |
| 2005/0207631 A1 | 9/2005 | Martens et al. | |
| 2005/0210285 A1 | 9/2005 | Williams | |
| 2005/0256866 A1 | 11/2005 | Lu et al. | |
| 2006/0042483 A1 | 3/2006 | Work et al. | |
| 2006/0248573 A1 | 11/2006 | Pannu et al. | |
| 2006/0294192 A1 | 12/2006 | Mao et al. | |
| 2007/0005341 A1 | 1/2007 | Burges et al. | |
| 2007/0023515 A1 | 2/2007 | Urken | |
| 2007/0064626 A1 | 3/2007 | Evans | |
| 2007/0143128 A1 | 6/2007 | Tokarev et al. | |
| 2007/0208613 A1 | 9/2007 | Backer | |
| 2007/0208677 A1 | 9/2007 | Goldberg et al. | |

(Continued)

FOREIGN PATENT DOCUMENTS

WO WO2007076297 7/2007

OTHER PUBLICATIONS

Golbeck, Jennifer, "Generating Predictive Movie Recommendations from Trust in Social Networks", Retrieved at <<http://trust.mindswap.org/papers/iTrust06.pdf>>, Proceedings of the Fourth International Conference on Trust Management. Pisa, May 2006, pp. 15.

(Continued)

*Primary Examiner* — Khanh Pham
*Assistant Examiner* — Johnese Johnson
(74) *Attorney, Agent, or Firm* — Cindy Jones; Danielle Johnston-Holmes; Micky Minhas (57) ABSTRACT

A recommendation system may use a network of relationships between many different entities to find search results and establish a relevance value for the search results. The relevance value may be calculated by analyzing trust and similarity components of each relationship between the search user and the entity providing the search results. The entities may be, for example, persons associated within express or implied social networks, or corporations or other organizations with a historical or other reputation. The relationships may be created through many different contact mechanisms and may be unidirectional, asymmetric bidirectional, or symmetric bidirectional relationships. The relationships may be different based on topic or other factors.

20 Claims, 5 Drawing Sheets

(56) References Cited

U.S. PATENT DOCUMENTS

| | | | |
|---|---|---|---|
| 2007/0214121 | A1 | 9/2007 | Ebanks |
| 2007/0250378 | A1 | 10/2007 | Hughes et al. |
| 2007/0255614 | A1 | 11/2007 | Ourednik et al. |
| 2008/0040314 | A1 | 2/2008 | Brave et al. |
| 2008/0214166 | A1* | 9/2008 | Ramer et al. ............... 455/414.3 |
| 2008/0228544 | A1 | 9/2008 | Woosley et al. |
| 2008/0270151 | A1 | 10/2008 | Mahoney et al. |
| 2009/0112989 | A1 | 4/2009 | Anderson et al. |

OTHER PUBLICATIONS

Kondratova, et al., "CIFS: A Trust-Based Multilayer Information Filtering System for Multi-Agent Mobile Information Systems", Retrieved at <<http://ieeexplore.ieee.org//stamp/stamp.jsp?tp=&arnumber=01628129>>, Proceedings of the 4th Annual Communication Networks and Services Research Conference (CNSR'06), May 24-25, 2006, pp. 8.

Montaner, et al., "Opinion-Based Filtering Through Trust", Retrieved at <<http://eia.udg.es/~mmontane/montaner-cia02.pdf>>, In Proceedings of the Sixth International Workshop on Cooperative Information Agents, Sep. 18-20 , 2002, pp. 15.

Mori, et al., "Web Mining Approach for a User-Centered Semantic Web", Retrieved at <<http://ftp.informatik.rwth-aachen.de/Publications/CEUR-WS/Vol-137/15_mori_final.pdf>>, Proc. Int'l Workshop on User Aspects on the Semantic Web in 2nd European Semantic Web Conference (ESWC2005), 2005, pp. 177-187.

Burke, Robin, "Hybrid Recommender Systems: Survey and Experiments†", Retrieved at <<http://www-mmt.inf.tu-dresden.de/Lehre/Archiv/Sommersemester_04/Hauptseminar/papers/burke2002.pdf>>, vol. 12, Issue 4, Nov. 2002, pp. 1-29.

Bedi, P. et al.; "Trust based Personalized Recommender System"; INFOCOM Journal of Computer Science; vol. 5, No. 1; Mar. 2006; pp. 19-26.

Hess, C.; "Trust-Based Recommendations for Publications: A Multi-Layer Network Approach"; TCDL Bulletin; vol. 2, Issue 2; Current 2006; 11 pages.

Kitisin, S. et al.; "Reputation-based Trust-Aware Recommender System"; Securecomm and Workshops; Aug. 28, 2006-Sep. 1, 2006; 7 pages.

* cited by examiner

HYBRID RECOMMENDATION SYSTEM

BACKGROUND

Searching for relevant information in a computer network such as the Internet is a complex task for which many different techniques have been applied. In many cases, conventional search algorithms may be useful in locating documents such as web pages that contain certain keywords.

Many websites may purport to express opinions or state facts about certain issues, products, services, or other items. Because the websites may be created by anyone, and the costs of producing such a website has very low overhead, the validity of the opinions or facts may be questionable unless the producer of the website has credibility.

The credibility of statements made on various websites may be unknown. For example, someone may use several anonymous email aliases to add comments praising a product on a website just to bolster the product's reputation. Because many such comments are essentially anonymous or unknown, it may be hard to tell if the comments are from actual owners of the product or from the advertiser posing as an owner.

SUMMARY

A recommendation system may use a network of relationships between many different entities to find search results and establish a relevance value for the search results. The relevance value may be calculated by analyzing trust and similarity components of each relationship between the search user and the entity providing the search results. The entities may be, for example, persons associated within express or implied social networks, or corporations or other organizations with a historical or other reputation. The relationships may be created through many different contact mechanisms and may have independent, unidirectional components. The relationships may vary based on topic or other factors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A recommendation system may use a network of relationships to find relevant search results. When a search result is found at some location within the network, a relevance value may be calculated by evaluating all of the relationships between the user and the source of the search results. This mechanism tailors the results to the characteristics of the specific user and may return radically different results for people with different characteristics.

The recommendation system may be useful for searching for information and receiving information that is relevant to a user. In many cases, one user's opinions, preferences, and other characteristics may be vastly different from another user. What is relevant to the first user may be irrelevant to the second.

The relevance of information may be determined by trust and similarity components of relationships between entities, which may be persons or organizations. The trust component may express how much trust one entity has in another entity. The similarity component may express how similar the two entities are.

In many cases, the relationships between entities may change based on the topic or category of search. For example, a medical doctor's opinion on a medical topic may be highly trusted, but the medical doctor's opinion on cellular telephones may not be. In another example, a user may value a friend's opinion on children's toys because that friend has children of the same age as the user, even though the user may not value the friend's religious or political views.

The recommendation system may gather information about relationships from many different sources. The sources may be online social networks, as well as relationships gathered from email systems, group memberships, and other sources. In some cases, similarity relationships may be established by searching for other entities and performing a comparison between the entities.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

Figure 1:
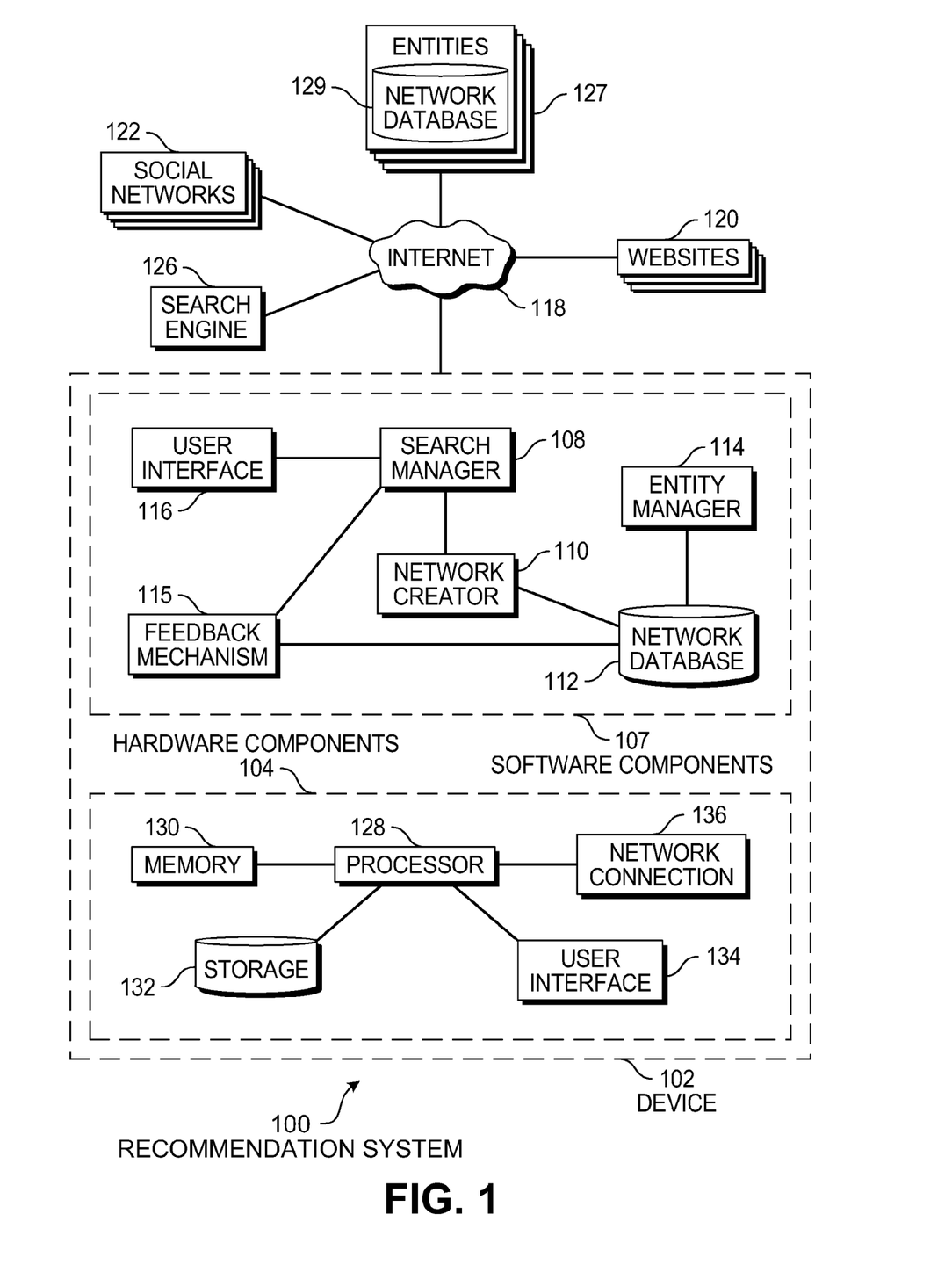
FIG. 1 is a diagram illustration of an embodiment showing a recommendation system that may be embodied in a single device.

FIG. 1 is a diagram of an embodiment 100 showing a system with a recommendation system. Embodiment 100 is a simplified example of a recommendation system that may operate largely on a single device and may obtain recommendations using a user's network of trusted or similar entities.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

A recommendation system may find search results and create a relevance value based on relationships that connect a user with the search results. A high relevance value may indicate that the search results would be highly valued by the user based on similarity and trust components of the relationships.

The recommendation system may produce search results that are more personal to the user than conventional keyword based search engines. The results may more closely correspond with the user's tastes, values, likes, and dislikes than other types of search mechanisms.

The recommendation systems may evaluate trust and similarity when determining a relevance value. In many embodiments, a weighting profile may be used to change the balance between trust and similarity for different categories of searches.

The concept of trust may take into account a user's trust or reliance in another person's opinion or knowledge. For example, a user may place a high trust an acknowledged expert in a specific field, but may place little trust in an anonymous source. The user may trust a cousin or other family member who may share similar values and experiences, or may trust a friend or colleague from school, place of employment, or other group.

In an example, a user may search for a therapist with a good reputation. The user may trust friends or family members that share the same ethical, religious, political, or personal views of the user, but may not place as much weight on opinions from anonymous people with whom the user may not share any values. In such an example, the trust component of a relationship may be more heavily weighted than a similarity component.

The concept of similarity may provide a high correlation between a user and another person where the two people share many common traits. For example, results obtained from another person that is the same age, sex, and having a similar family status and education may be highly correlated to a user in some circumstances.

In many cases, the category of search may drastically change the weighting profile between trust and similarity components of relationships. For example, a user may wish to search for a camera to purchase. In such a case, a camera opinion from a person who shares the same income, age, and hobbies may highly correlate with the user's expectations, but a camera opinion from a person who is many years older or younger may not be as highly correlated. In the example, a person in their mid thirties with a family of three small children may wish to get a camera suggestion from a similar person.

The camera suggestion may include a camera useful with children and may have features that a young parent may use. Conversely, a camera suggestion from an eighty-year-old grandparent may have a different feature set or capabilities than what the young parent may wish to have. In the example, the similarity component of a relationship may be more highly weighted than a trust component of the relationships.

In another use scenario, a person may wish to find information on a medication for a specific ailment. In such a scenario, the factors of both trust and similarity may play a role in identifying results that may be meaningful and useful to a particular user. A user may trust opinions from medical experts that have experience in the specific ailment. Also, the user may consider opinions from persons who are similar in age, weight, or other characteristics that have experience with the medication and the specific ailment. In some cases, the user may wish to consider opinions from persons who have similar behaviors, such as persons with similar diet and exercise regimes, who have received similar treatments or therapies, or who have has similar side effects, for example. Less relevant would be opinions from dissimilar people who may experience the medication or specific ailment in a different manner than the user, as well as opinions from people who do not have direct experience with the ailment.

In yet another use scenario, a user may wish to find out about certain symptoms that the user is experiencing but the user may not know the underlying condition. In the scenario, the user may value opinions or results from persons that are physically similar in age, weight, gender, or genetic makeup. The user may also value opinions from people with similar behaviors, such as those people who take similar medications or have received similar treatments, or who follow a similar diet and exercise protocol. The user may consider irrelevant the opinions of otherwise trusted people who have never experienced the symptoms being searched.

The recommendation systems may calculate a relevance value by evaluating the trust and similarity components of relationships between entities. In some cases, a series of several relationships may be evaluated to determine a relevance value for a search result. In a simple example, a first person may have a relationship with a second person, who may have a relationship with a third person, who in turn may a relationship with a fourth person. The fourth person may have information about a subject for which the first person is searching. The relevance value of the information may be calculated by analyzing all of the relationships between the first person and the fourth person. If all of the relationships are highly trusted and similar relationships, for example, the relevance value may be high. If one or more of the relationships is not trusted or two of the parties in a relationship are not similar, the relevance value may be low.

A network of relationships may be used to calculate relevance values. Each entity within the network may have express or implied relationships with other entities. By traversing the various relationships, a relevance value may be calculated for information supplied by one entity and received by another. In many cases, relationships may be unidirectional and may or may not be reciprocal. For example, a first person may trust a second person but the second person may not trust the first.

The entities in the network may be persons, corporations, groups, or other entities. A person may be a natural person that may have various characteristics that may be compared to other entities to determine similarities. A person may also have express or implied trust relationships with other entities, including non-person entities such as corporations or other groups.

An entity may be a corporation or group. The corporation or group may be comprised of persons, but may or may not expose or identify the individual persons. In many cases, a person may have a trust relationship with a corporation. For example, a person may trust a specific news service and may share similar values or views with the news service. A person may have some trust and share similarities with newsgroups, weblogs, charitable organizations, institutions, websites, corporations, business organizations, committees, trade organizations, service organizations, religious institutions, educational institutions, government organizations, or other non-person entities, for example.

Because the relationships may be unidirectional, a person may have a high trust relationship with a weblog, for example, but the weblog may have no relationship or a low trust relationship with the person. There may be similarities between the weblog and the person so that a similarity component may be established. As a user interacts with the weblog, such as posting comments on the weblog or linking to the weblog, the weblog's trust component of its relationship with the person may be updated over time by a learning component or feedback mechanism of a network management system.

The relationships may have express or implied relationships. An express relationship may be one in which the user makes an affirmative indication of the relationship. For example, many social networks exist where a first person may declare a friend relationship with a second person. Some social networks may establish a relationship when the second person verifies the relationship while other social network may not. In some cases, an express relationship may be defined by simply defining one using an entity manager application.

In many cases, relationships may be inferred by a user's actions or by other indicators. For example, email correspondence between two entities may indicate a relationship, as well as telephone calls, website browsing, membership in a group, or other interactions. An entity manager application may identify those interactions between a user and other entities to imply relationships between those entities.

Similarity may be a component of a relationship. The similarity between two entities in a network may lie on any factor. In some cases, the similarity may be cultural aspects, such as nationality, citizenship, native tongue, religion, or the country, state, or city of residence, for example. Similarity may be found in hobbies, educational achievement, university affiliation, or likes and dislikes. In some medical applications, similarity between people may include genetic similarities, common conditions such as symptoms or diagnoses, physical attributes such as age, weight, and gender. In some cases, similarity between entities may be identified from common treatments for disease, similar responses to a medication or other treatment. Psychological similarities may be include persons with common outlook on life, satisfaction with medical conditions or treatments, political, economic, or religious issues.

In some embodiments, the similarity components may be expressly stated by a user. For example, a user may fill out a form that identifies the user's likes and dislikes as well as cultural or other background information. In a medial situation, the user may fill out a medical history, for example.

In some embodiments, the similarity components may be implied from the user's behavior or other factors. For example, a user's membership in social, religious, or political groups may indicate certain characteristics as well as the user's address, educational level, or other factors. For example, a user who is a member of a church and who has donated to a political party may imply the user's religion and political preferences. In another example, a user's online browsing habits may be used to infer characteristics based on the types of websites the user visits.

A network may be constructed by linking the relationships between various entities. As is common in social networks, a first person's list of contacts, combined with the list of contacts from each of the first person's contacts can produce a very large number of relationships between a very large number of entities, especially when three, four, or more generations of relationships may be considered.

Within this specification, the term "generations" of relationships may be used to describe the number of degrees of separation or lowest number of relationships between two entities. A network with one generation of relationships may contain only those entities that have existing, direct relationships with a starting entity. A network with two generations of relationships may contain the first generation along with all of the entities that have existing, direct relationships with the entities in the first generation and so forth. Some embodiments may create networks that limit the number of generations to a predefined number.

Figure 2:
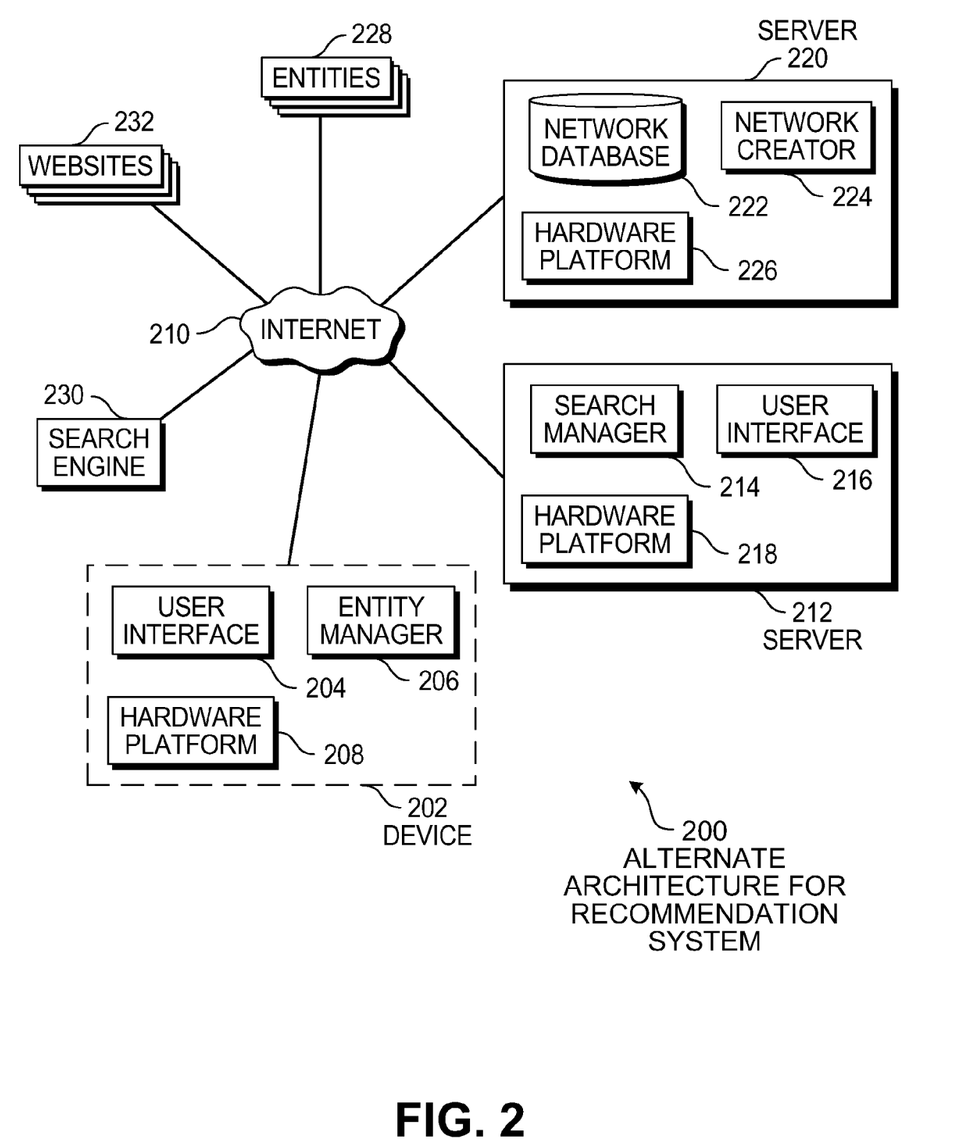
FIG. 2 is a diagram illustration of an embodiment showing a recommendation system that may be embodied in a client-server architecture.

The architecture for a recommendation system may come in many variants. Embodiment 100 illustrates a system where a single device 102 may contain a database defining the network and the mechanisms for performing a search. Embodiment 200 illustrated later in this specification illustrates a system where the database defining the network and the search mechanisms are remote services that may be provided over the Internet or other network connection. Other embodiments may have different architectures and structures.

Figure 4:
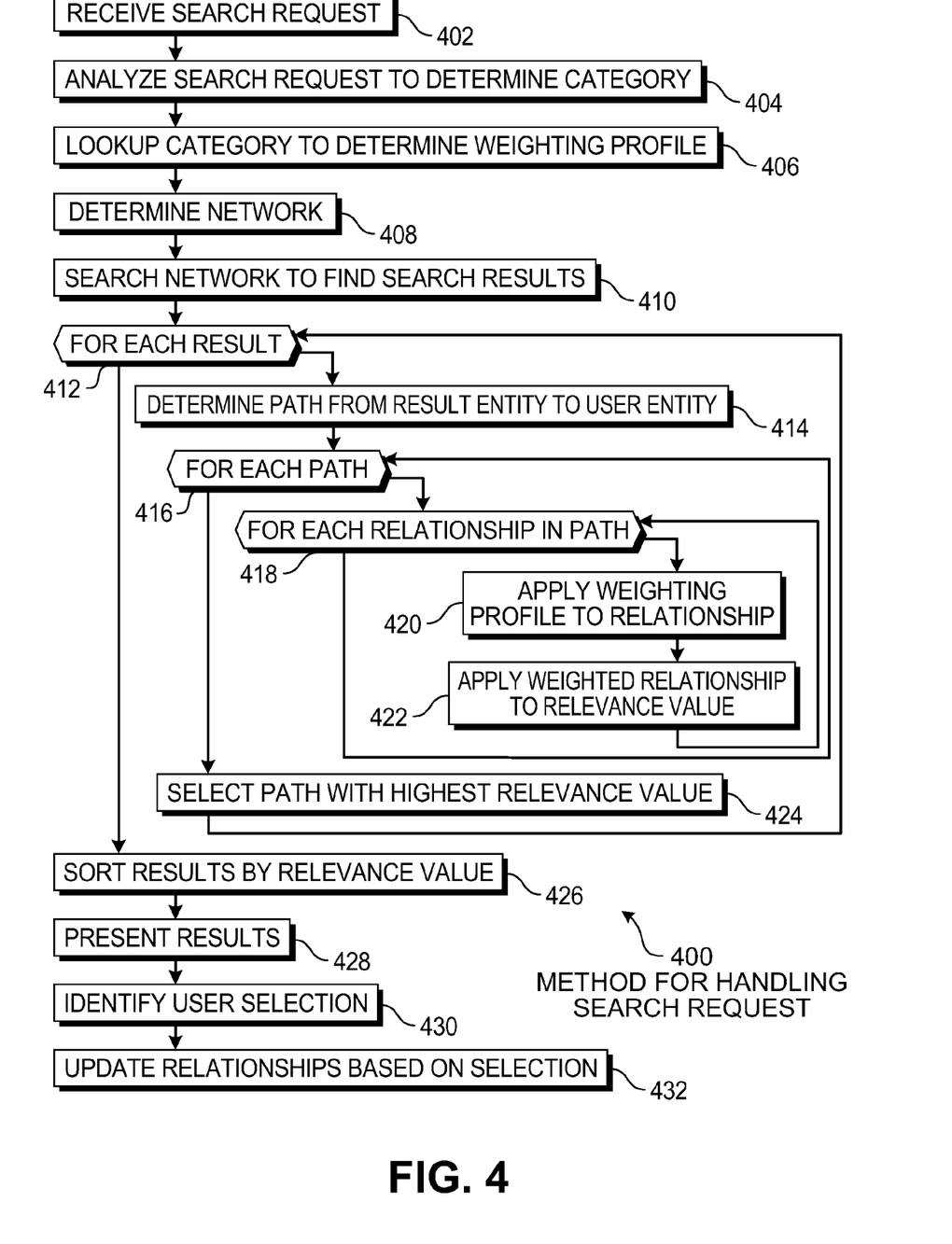
FIG. 4 is a flowchart illustration of an embodiment showing a method for processing a search request where a predefined network is used for a search.
Figure 5:
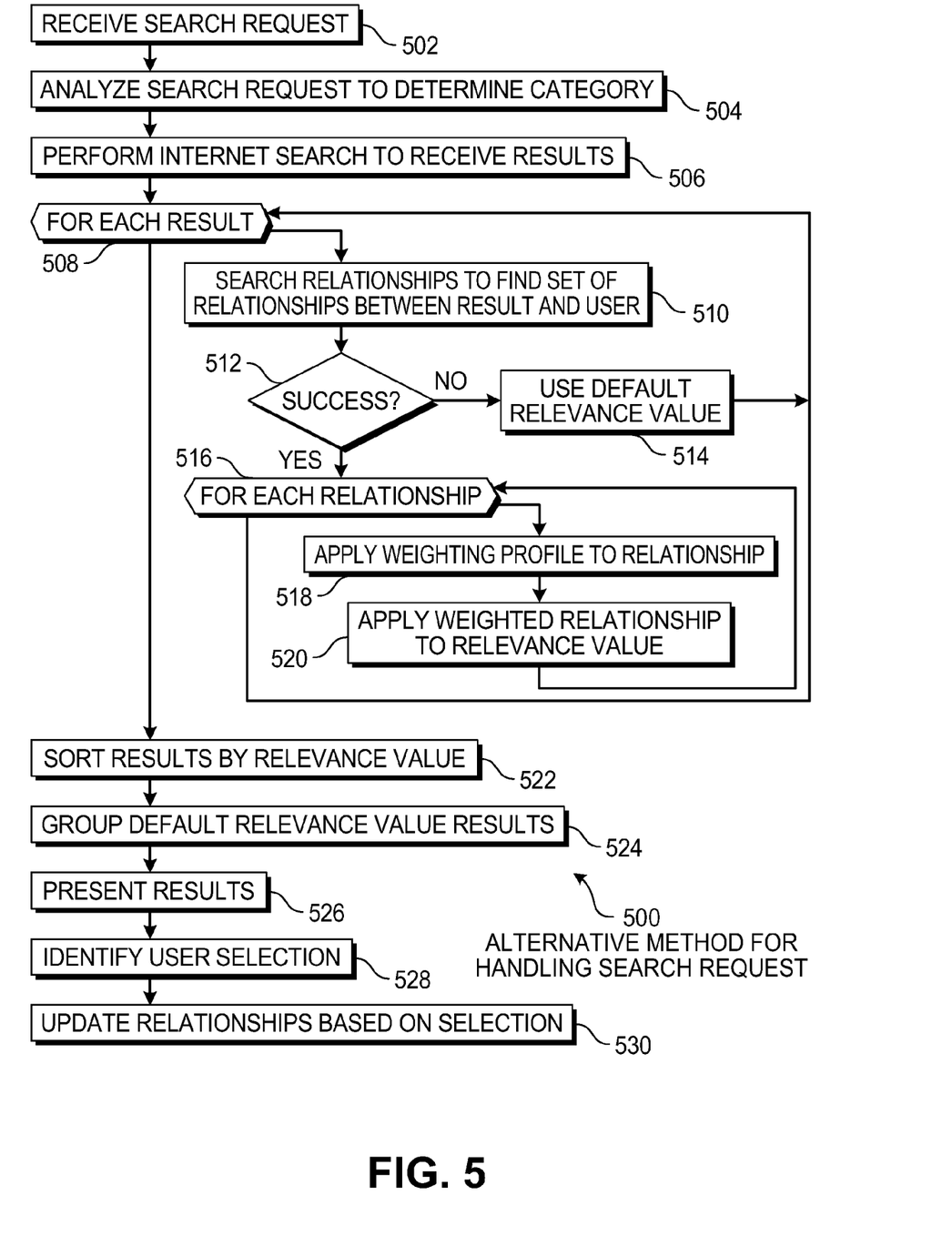
FIG. 5 is a flowchart illustration of an embodiment showing a method for processing a search request where a set of relationships may be identified after search results are found.

The operation of a recommendation system may also have different sequences of operation. In one sequence, such as presented in embodiment 400 later in this specification, the network may be first created and then searched to find responses. Each response may be evaluated to determine a relevance value using the relationships in the network. In another sequence, such as presented in embodiment 500 later in this specification, a search may be performed and for each response, relationships may be examined to find a connection between the original entity and the source of the response. If a set of relationships can be found, a relevance value may be established. If no set of relationships can be found, the result may be classified as unknown, treated separately from a search result with a relevance value, or given a default relevance value. Other embodiments may have different sequences of operation.

Embodiment 100 illustrates an embodiment where most of the components of a recommendation system operate on the device 102. The device 102 may be comprised of hardware components 104 and software components 106, and may represent a common computing device such as a personal computer, server computer, or other device. The device 102 may be any type of computing device that has a processor and is able to operate software components. In addition to the common computing devices above, the device 102 may be a portable device such as a laptop computer, cellular telephone, portable scanning device, personal digital assistant, or portable gaming device. The device 102 may also be a game console, network appliance, or other device.

Embodiment 100 may operate using various hardware components 104. A processor 128 may interact with random access memory 130 and nonvolatile storage 132. A user interface 134 may include mechanisms for presenting and collecting information. A typical embodiment may include a graphical or textual display, audio output, tactile output, or other output mechanisms, as well as a keyboard, audio input device, and pointing device such as a mouse, touchscreen, joystick, or other mechanism. The hardware components 104 may also include a network connection 136 that may connect the device 102 with other devices. Examples of a network connection 136 may include hardwired connections such as Ethernet and RS-232, as well as wireless connections such as WiFi, WiMAX, cellular telephony, personal area network connections such as Bluetooth, and other connections.

The software components 106 may include a search manager 108. The search manager 108 may perform general management actions with respect to searching for information. Specifically, the search manager 108 may receive a search request from a user interface 116 or other source, find responses for the search request, and determine a relevance value for each search response using a network and relationships within those networks. Examples of the operations of a search manager 108 may be found in embodiments 400 and 500 later in this specification.

In some embodiments, the search manager 108 may perform an actual search, while in other embodiments, a search engine 126 may be used. The search engine 126 may be a remote search engine that is accessed over the Internet 118.

The search manger 108 may receive search requests and display search results on a user interface 116. The user interface 116 may represent a graphical user interface or other information that may be captured and displayed on a user interface hardware system. In some cases, the user interface 116 may be created on the device 102 and displayed on another device, such as when the user interface 116 is embodied in a Hyper Text Markup Language (HTML) document, for example.

When calculating a relevance value for a search result, the search manager 108 may traverse a network of entities. The network of entities may be created by a network creator 110 from information concerning entities that are stored in a network database 112.

The network database 112 may contain information from which a network or portion of a network may be constructed. In a typical embodiment, the network database 112 may contain entries for various entities and the relationships between entities.

In some embodiments, the network database 112 may contain information about entities with which the user of the device 102 has direct relationships. In such an embodiment, every relationship that may be in place between the user and other entities may be expressly defined. In such embodiments, various other entities 127 may contain network databases 129 that may contain entities and relationships to those entities. A network may be constructed by traversing the various relationships to identify next generation relationships. The process may continue until a search result is found at an entity, until a certain number of generations is examined, or until some other criteria is met.

In some such embodiments, a crawler or other network traversing mechanism may gather entities and relationships as a background process and store the entities and relationships in a network database.

An entity manager 114 may identify entities and relationships that may be used for determine relevance values for search results. In some embodiments, the entity manager 114 may perform a network crawl to gather entities and relationships from many other entities 127 across the Internet 118 or other network.

Figure 3:
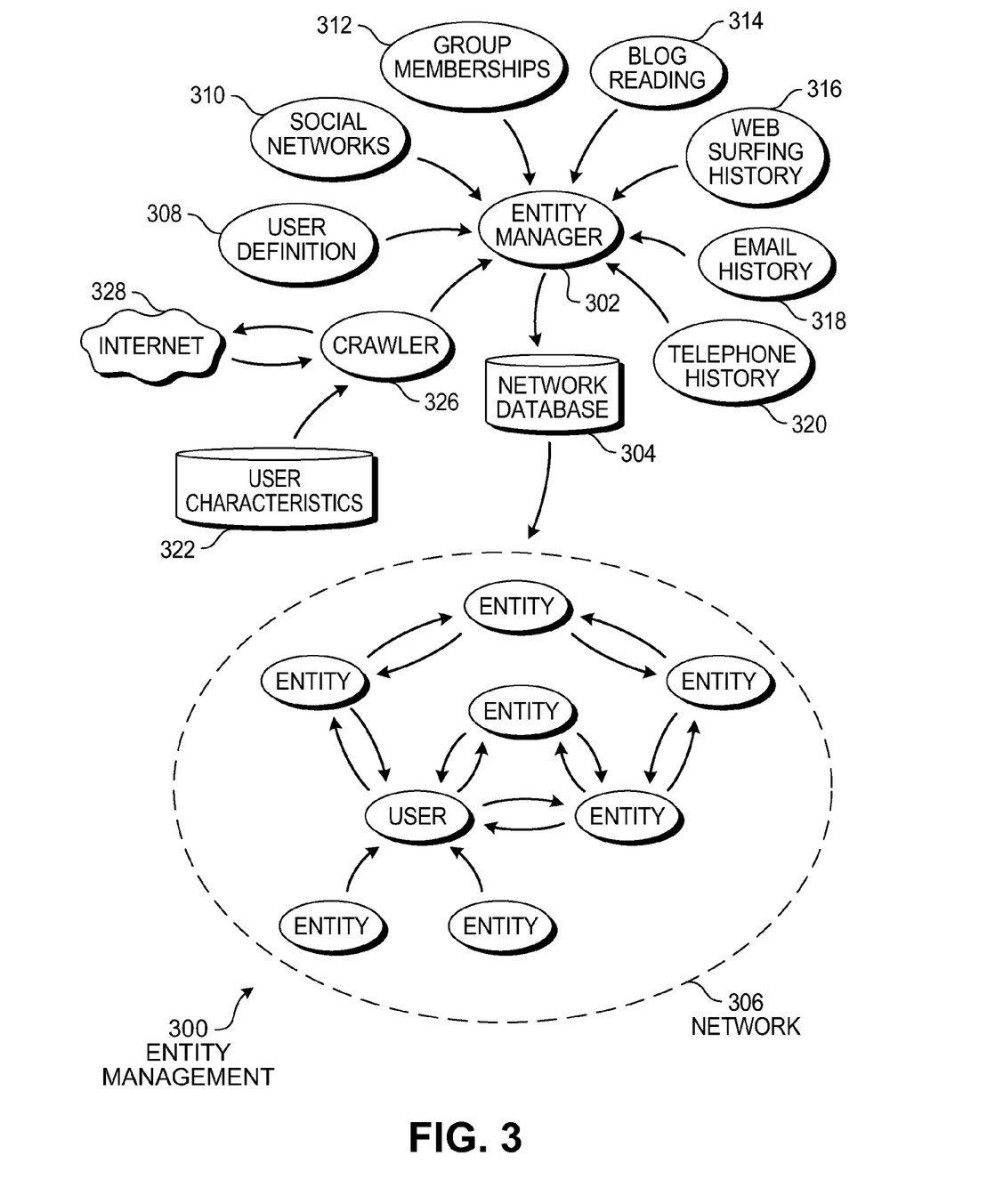
FIG. 3 is a diagram illustration of an embodiment showing operations of an entity manager.

The entity manager 114 may identify entities and establish relationships with those entities by several different actions. In some cases, the entity manager 114 may operate with user interaction to expressly identify entities and classify relationships. In some cases, the entity manager 114 may passively monitor a user's interactions identify entities and classify relationships. An example of the operations of an entity manager is presented in embodiment 300 later in this specification.

Some embodiments may include a feedback mechanism 115 that may update relationships. The feedback mechanism 115 may analyze the user's use of search results and may update a relationship based on the user's actions. For example, a user may receive a set of search results and may interact with a weblog search result, such as by reading various articles or postings on a weblog. The interaction with the weblog may indicate that the user values the weblog and may trust the weblog to some extent. In such a case, the trust component of the user's relationship with the weblog may be updated each time the user interacts with the weblog.

In some cases, the feedback mechanism 115 may identify new relationships based on the user's actions. For example, a user may have a default trust component for an entity that produces a weekly column in a large news service. The trust component may be initially assigned based on the user's likes or dislikes relating to the news service as a whole, but as the user reads the weekly column, the user may have a greater affinity for the person or entity that writes the specific column. As the user establishes a history of reading the column, the entity that writes the column may be identified and updated with increasing trust as the user interacts with the column.

In another example, a user may be presented with several search results that were obtained from sources that are separated from the user by two or more generations of relationships. If the user interacts with the entity supplying the search results and the user actions indicates that the user likes the entity, a new relationship may be established directly between the user and the weblog.

In many cases, a relevance value for a search result may be calculated from many relationships. Typically, a series of relationships may define connections between a user entity and a source entity for a search result. In order to determine a relevance value, the relationships between all of the entities may be summed, multiplied, or otherwise aggregated together so that a relevance value for the particular user may be determined.

The actual calculations of a relevance value may vary with the definition of a relationship. For example, a trust component and a similarity component may be defined as ranging from 0 to 1, where 0 has no trust or similarity and 1 has the highest trust and precise matching for similarity. In another embodiment, the trust component and similarity component may be defined as ranging from −100 to +100, where −100 is no trust or a known falsehood and highest dissimilarity, zero is a default value, and +100 is the highest trust and highest similarity. Still other embodiments may have other mechanisms for defining trust components and similarity components, and for performing calculations to determine a user's relevance value for a search result.

FIG. 2 is a diagram of an embodiment 200 showing a system with a recommendation system. Embodiment 200 is a simplified example of a recommendation system that may operate using remote servers to perform many search and recommendation functions.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 is an example of a system that may perform many of the same functions as embodiment 100, but may be a distributed system where much of the computations and data analyses are performed by remote devices rather than a user device. One use scenario for embodiment 200 may be to process search requests from a device such as a cellular telephone, desktop computer, or other device that may not have large amounts of computational or data analysis capabilities.

In embodiment 200, a device 202 may be a user device that has a user interface 204 and an entity manager 206. The user device 202 may operate on a hardware platform 208, which may include some or all of the hardware components 104 as described in embodiment 100.

The device 202 may be any type of device with which a user may interact. Such a device may be a personal digital assistant, personal computer, laptop computer, mobile or cellular telephone, or any other device. In some cases, the device 202 may be a server computer, network appliance, or other device.

The architecture of embodiment 200 may be to have the user interface components and the entity management components located at a user's device, but have remote servers 212 and 220 perform a bulk of the search management and network database management.

In the user's device, the user interface 204 may be an interface through which the user enters a search request and receives search results, where the search results may be aggregated and ranked using a relevance value calculated for each search result. In some cases, the user interface 204 may be an HTML document that is viewed using a web browser or other application operating on the device 202, but the HTML document may be supplied by server 212.

The entity manager 206 may perform many of the functions of the entity manager as described in embodiment 300 presented later in this specification. The entity manager may recognize entities with which a user may have a relationship, and may establish a relationship on a network that may be used for providing relevance values for search results. In some embodiments, the entity manager 206 may perform the operations of a feedback mechanism, such as the feedback mechanism 115 of embodiment 100.

The server 212 may operate on a hardware platform 218 and may perform the functions of a search manager 214 and user interface 216. The function of a search manager 214 may be similar to the functions of a search manager 108 described in embodiment 100. The function of a user interface 216 may create a user interface that may be displayed on the device 202. In one embodiment of such a function, the user interface 216 may create an HTML or other document describing information to be shown on a user interface, then transmit the HTML or other document to the device 202 for display on the user interface 204.

The hardware platform 218 may be any type of hardware, and may contain components similar to the hardware components 104.

The server 220 may operate on a hardware platform 226 and may perform the functions of a network database 222 and network creator 224, which may be similar to the functions described for the network database 112 and network creator 110 as described in embodiment 100.

Embodiment 200 may operate by a user entering a search request using the user interface 204 of device 202. The search request may be transmitted to the server 212 and processed by the search manager 214. The search manager 214 may operate in several different manners to identify search results, find the relationships between the user and an entity that supplies the search results, and calculate a relevance value. Two different methods may be illustrated in embodiments 400 and 500 presented later in this specification.

In some embodiments, a search engine 230 may be used to locate websites 232 or entities 228 that may have search results. For each search result, the server 220 may provide a set of relationships between the user and the search result, and the search manager 214 may calculate a relevance value. In such an embodiment, there may be cases where a search result cannot be connected to the user through a relationship and thereby no relevance value may be calculated for the search result.

In other embodiments, the search engine 230 may use a network supplied by the server 220 to perform a search. The network may be traversed to identify search results for which relevance values may be calculated.

FIG. 3 is a diagram of an embodiment 300 showing some operational elements that may be used by an entity manager. The entity manager 302 may perform the functions described for the entity manager 114 in embodiment 100 and entity manager 206 in embodiment 200.

The entity manager 302 may identify entities for which a relationship may be expressed or implied. The entities may include persons as well as groups such as corporations or other organizations that may or may not have a natural person as the focal point.

An entity manager 302 may identify relationships and define the relationships using a trust component and a similarity component. Some embodiments may have additional components defined for relationships.

A trust component may express how well a user trusts another entity, and may express a high degree of trust, a high degree of distrust, or some area in between. In some cases, the trust component may be a default value.

In some cases, a trust component may be determined by applying a trust component of a group or association of which the entity may be a member. For example, a user may have established a trust component for an entity that is a corporation. A person who works at the corporation may be assigned the same trust component when that person is created as an entity.

In some cases, a trust component may be determined by analyzing the entity. For example, a person may author a weblog that is highly regarded based on the number of links to the weblog, the number of comments on various postings, or the number of times the weblog has been cited by other weblogs or news sources. Based on the analysis of the weblog, a trust component may be calculated or implied.

A similarity component may be determined by comparing various user characteristics with the same or similar characteristics of an entity. In some cases, a database of user characteristics 322 may be identified and compared to information obtained about an entity.

The entity manager 302 may identify entities and determine relationship characteristics between the user and the newly found entity. The entity manager 302 may add those entities and relationships to the network database 304, which may be used to create a network 306.

The network 306 may represent various entities and the relationships between those entities. The relationships may be unidirectional relationships where the relationships describe one of the directions of a relationship. In some cases, a first entity may have a relationship defined with a second entity, but the second entity may not have a relationship defined back to the first entity. In other cases, a first entity may have a relationship with one set of characteristics from a second entity, but the second entity may have a relationship defined with a second set of characteristics. Still in other cases, two entities may have equal relationships in both directions between each other.

In some embodiments, a search engine may traverse the network 306 when performing a search. In such a search, a random walk or crawling algorithm may be used to search from entity to entity to find a search result. In other embodiments, a search manager may find results first, then search for relationships between the user and the search result. Both types of algorithms are illustrated in embodiments 400 and 500, respectively, later in this specification.

The entity manager 302 may use direct user definitions 308 to define an entity and relationship characteristics to the entity. The user definitions 308 may come in the form of a user interface through which a user may browse to an entity and define the relationship. In some cases, the user may enter the entity by typing a Uniform Resource Locator (URL) or other address or identifier for the entity.

In some embodiments, a user may be able to define certain parameters for a relationship. One parameter may be a different a trust component for various types or categories of queries. For example, a user's friend may be an expert in photography but may have different political views from the user. The user may define the friend as a very trusted source for photography but not to be trusted for politics.

In some cases, a user may be able to define different weighting profiles for certain categories of queries by interacting with a user definition 308 user interface. In some cases, such weighting may be predetermined and not changeable by a user.

A weighting profile may define how much weight is given to a trust component of a relationship and how much weight may be given to a similarity component. In embodiments where additional components are defined for a relationship, the weighting profile may define the weighting of the additional components as well.

A weighting profile may be defined to give more relevance to trust component of a relationship in categories where a person's personal beliefs may play a role in determining relevance, for example. In one use scenario, a person may search for something relating to religion or politics. In such a scenario, relevant results may be more highly weighted on trust than similarity.

In another use scenario, a user may search for a new cellular telephone. In such a cases, the more relevant results may be from people who are similar to the user in age, economic status, education, sex, marital status, or other factors, as opposed to people who share a similar religious or political view.

The entity manager 302 may receive information from various sources to identify entities and create relationships. In some embodiments, the process of identifying entities and creating relationships may be performed as a background process. In some embodiments, the user may have some input in the process by approving and possibly modifying the selections.

The entity manager 302 may identify entities through social networks 310 and group memberships 312. In some embodiments, the entity manager 302 may actively query a social network 310, for example, by sending queries to a social network 310 and receiving a response. In some embodiments, the entity manager 302 may passively monitor social network usage to identify entities.

The group memberships 312 may be any type of group of which the user may be a member. For example, a user may be a member of a service organization, religious institution, or other group. In other examples, the user's current or former place of employment, city or neighborhood of residence, college or educational institution, or other group may be used to identify entities and establish relationships.

A user's interaction with the Internet may be used to identify entities and establish relationships by the entity manager 302. For example, a user's interaction with blogs 314 and general web surfing history 316 may be used to identify entities and establish relationships. In some embodiments, a user's interaction with a weblog 314 may indicate a relationship that may be stronger than a relationship to a general website. A user may interact with a weblog 314 by reading updated posts, entering comments, and subscribing to periodic updates. Such actions may indicate that the user has a relationship with the entity responsible for the weblog 314.

In some embodiments, a user may be able to expressly define a level of trust or similarity when the user reads a blog entry or interacts with a website. For example, a user may read an article and highlight the article as one that the user likes and trusts. A relationship may be formed from the user's expression in such a case. Some embodiments may imply a trust or similarity when a user repeatedly reads a blog or several articles authored by the same person or from the same source. Email history 318 and telephone history 320 may indicate that a user has contact with a person or other entity, and that a relationship may be defined for the entity. Repeated telephone calls or email interactions may indicate high trust or similarity. In some cases, the email interactions may not be direct contact with an entity. For example, a newsgroup distribution list may include email addresses or other identifiers for persons with which the user has never communicated directly. Even so, the members of the distribution list may be identified as entities and relationships established at least for the same categories as the distribution list may contain. For example, a user may subscribe to a newsgroup distribution list that discussed cooking topics. Members of the newsgroup distribution list may be added as entities with at least a minimal amount of trust for cooking related topics.

In some embodiments, a search engine or crawler 326 may search the Internet 328 to find entities based on user characteristics 322. For example, the crawler 326 may identify several persons that are similar to the user based on age, sex, education, marital status, location, or other factors. These persons may not have had interaction with a user, but these persons may be added as entities based on their similarity. When such persons are added as entities, a default level of trust may be established or the entity may be analyzed to determine a starting trust value which may be updated as a user interacts with the entity at a later time.

In some embodiments, a default level of trust may indicate that the trust is unknown. In such embodiments, a feedback mechanism, such as the feedback mechanism 115, may monitor interaction with a user and search results coming from a source with unknown trust. The feedback mechanism may determine a level of trust based on the user's interaction with the search results and update the level of trust.

In some embodiments, the crawler 326 may perform a search for an entity after an entity is identified. The search may include comparing the user characteristics 322 with characteristics of the entity to determine or modify a similarity component for the relationship. In some cases, the search may include evaluating the entity to determine or modify a trust relationship. In some cases, an initial trust or similarity component may be defined through analyzing email interaction or weblog interaction, for example, then a more comprehensive search may be performed by the crawler 326 to update the trust or similarity component.

FIG. 4 is a flowchart illustration of an embodiment 400 showing a method for handling a search request. Embodiment 400 is an example of a process that may be performed by a search manager, such as search manager 108 in embodiment 100 or search manager 214 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 illustrates an example of a method whereby a network is determined prior to searching. The network may be searched by traversing relationships between entities using various crawling or random walk algorithms.

Embodiment 500 illustrates a different example of a method that may be performed by a search manager wherein a search is performed first, then relationships may be found after the search. In such embodiments, a continuous series of relationships may not exist and in such cases, a relevance value may not be calculated.

A search request may be received in block 402. The search request may be obtained in any manner. In many cases, a user may type a search request into a dialog box or express the search request in some other direct form. In some cases, an application may create a request and transmit the request to a search manager.

The search request may be analyzed in block 404 to determine a category for the search request. The category may be any type of classification that may be used to separate different types of search requests which may have different weighting profiles assigned to them or for which trust or similarity components of a relationship have differing properties.

In block 406, the category may be looked up to determine a weighting profile for the category. In some embodiments, a category database may be maintained that defines weighting profiles for certain categories. In some embodiments, such a category database may be maintained on a remote server and accessed as a web service or other mechanism.

In block 408, the network may be determined. In some cases, the network may be constructed based on the category of the search request. Such cases may be used when some relationships may be defined for only a certain set of categories, for example. When the search request category is not in the set of categories for the relationship, a network may be created without that relationship and the associated entity may be ignored for the search.

In some embodiments, a network may be created with a predetermined number of generations. Such embodiments may be used to limit the generations to a manageable number for searching purposes. Such embodiments may be useful where the category is such that high numbers of generations of relationships may dilute the relevance values of search results.

The network may be searched in block 410 using the search request. In some embodiments, a random walk search or other search algorithm may be used.

Each search result may be analyzed in block 412. For each search result, a path from the result entity to user entity may be determined in block 414. In some cases, more than one path may exist between the user entity and the result entity. In such cases, some entities and their relationships may be in parallel with other entities, for example.

For each path in block 416, and for each relationship in the path in block 418, the weighting profile may be applied to the relationship in block 420 and the weighted relationship may be applied to a relevance value in block 422.

The process of blocks 416 through 422 may analyze various paths between the user and the source of the results. The analysis may apply the weighting profile to the relationship, then add the results to a relevance value. Each embodiment may have different mechanisms and may perform different calculations for performing these steps.

After analyzing all of the different paths between the result entity and the user entity in blocks 416 through 422, the path with the highest relevance value may be selected in block 424. Each result may be analyzed using the process of blocks 414 through 424.

The results may be sorted by relevance value in block 426 and presented to a user in block 428.

When a monitoring or feedback system is in place, a user selection from the presented results may be identified in block 430 and one or more relationships may be updated based on the selection in block 432. The process of blocks 430 and 432 may perform some monitoring to determine how a user interacted with the result to gage the user's interest in the result, then update the relationships based on the interaction. The updated relationships may be stored in a network database for later use. In some cases, a new relationship may be created when the user interacts with a new entity.

FIG. 5 is a flowchart illustration of an embodiment 500 showing a second method for handling a search request. Embodiment 500 is an example of a process that may be performed by a search manager, such as search manager 108 in embodiment 100 or search manager 214 of embodiment 200.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 500 illustrates an example of a method that may be performed by a search manager wherein a search is performed first, then relationships may be found after the search. In such embodiments, a continuous series of relationships may not exist and in such cases, a relevance value may not be calculated. Embodiment 400 is similar to embodiment 500 and many of the same explanations and operations of the various steps may apply to either embodiment.

Embodiments 400 and 500 are merely examples of different ways a search request may be processed and how relevance values may be calculated for the results. Other embodiments may determine relevance values in other manners as well.

A search request may be received in block 502, and analyzed in block 504 to determine a category. The process of blocks 502 and 504 may be similar to that of blocks 402 and 404 of embodiment 400.

An internet search may be performed in block 506 to receive results. The internet search may be performed without regard to the network, in contrast to the each performed in block 410 of embodiment 400.

Each search result may be evaluated in block 508. For each search result, the network of entities may be searched to find a set of relationships from the user entity and the result entity in block 510. The set of relationships may be a series of relationships that link the user with the result.

If the search in block 510 is not successful in block 512, a connection of relationships could not be found and a default relevance value may be assigned to the result in block 514. In some embodiments, the default relevance value may be a nominal value. In other embodiments, the result may be classified as not having a relevance value so that such results may be grouped separately or handled differently in the user interface or when tracking the user's selection of the results.

If a set of relationships are found in block 512, each relationship may be analyzed in block 516 by applying a weighting profile to relationship in block 518 and applying the weighted relationship to a relevance value in block 520. The process of blocks 516 through 520 may be the same as the process of blocks 418 through 422 of embodiment 400.

After each result is processed in block 508, the results may be sorted by relevance value in block 522 and those results with a default or no relevance value may be grouped in block 524. The results may be presented to a user in block 526 based on the sorting and grouping of blocks 522 and 524.

A user selection may be identified and monitored in block 528 and relationships may be updated based on the selection in block 530. The process of blocks 528 and 530 may be the same as the process of blocks 430 and 432 of embodiment 400.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
receiving a search request from a search user;
creating a network of entities, the network including relationships among the entities, wherein the entities include a search user entity representing the search user and one or more result entities;
defining trust components and similarity components for the relationships among the entities, wherein the similarity components express relative similarity of the entities and the trust components express relative trust among the entities;
identifying a plurality of search results, wherein the one or more result entities provide the plurality of search results and the plurality of search results are identified based on the search request;
for the plurality of search results provided by the one or more result entities, determining, from the network, a set of relationships connecting the search user entity to the one or more result entities along one or more paths;
determining, based on the set of relationships connecting the search user entity to the one or more result entities, relevance values for the plurality of search results, wherein the relevance values are determined based on both:
individual similarity components that express relative similarity of individual entities along the one or more paths, and
individual trust components that express relative trust among the individual entities along the one or more paths;
ranking the plurality of search results based on the relevance values for the plurality of search results; and
presenting, to the search user, individual search results from the plurality of search results according to the ranking,
wherein at least the ranking is performed by a hardware computer processor.

2. The method of claim 1, further comprising:
performing an analysis of the search request to determine a category of the search request;
determining that the category of the search request is not included in a set of categories for a first one of the individual entities along the one or more paths; and
responsive to determining that the category of the search request is not in the set of categories for the first individual entity, ignoring the first individual entity when identifying the plurality of search results.

3. The method of claim 1, wherein the network is created prior to receiving the search request.

4. The method of claim 1, wherein the network is created after receiving the search request.

5. The method of claim 1, further comprising:
performing an analysis of the search request to determine a category of the search request; and determining a weighting for the trust components and the similarity components, the weighting being a function of the category,
wherein the trust components are weighted more heavily than the similarity components for some categories, and
wherein the similarity components are weighted more heavily than the trust components for other categories.

6. The method of claim 1, wherein the search user entity is a first person in a social network and an individual result entity is a second person in the social network that provides one or more of the individual search results that are presented to the first person.

7. The method of claim 1, wherein an individual result entity is an organization that provides one or more of the individual search results that are presented to the search user.

8. The method of claim 1, further comprising:
limiting the network to a predefined number of generations of relationships among the entities.

9. The method of claim 1, further comprising:
determining the similarity components of the relationships based on traits of the entities.

10. The method of claim 9, wherein the traits used to determine the similarity components of the relationships include:
age of the entities,
sex of the entities,
family status of the entities, and
education of the entities.

11. The method of claim 9, wherein the traits used to determine the similarity components of the relationships include one or more of:
age of the entities,
sex of the entities,
family status of the entities, or
education of the entities.

12. The method of claim 1, further comprising:
applying a random walk search algorithm to search among the entities to find the individual search results that are presented to the search user.

13. The method of claim 1, wherein the creating the network further comprises:
identifying a first set of first entities having first relationships with the search user entity;
adding the first set of first entities to the network; and
for individual first entities in the first set, identifying a second set of second entities having second relationships to the individual first entities, and adding the second set of second entities to the network.

14. The method of claim 13, wherein the creating the network is performed as a background process prior to receiving the search request.

15. The method of claim 1, wherein:
an individual result entity is a weblog that provides one or more of the individual search results that are presented to the search user; and
at least one of the individual trust components expresses relative trust of the search user in the weblog.

16. A system comprising:
a database comprising entities and relationships among the entities, wherein:
the entities including a search user entity representing a search user and one or more result entities,
the relationships include trust components and similarity components,
the similarity components express relative similarity among the entities, and
the trust components express relative trust among the entities;
a network creator configured to identify a starting entity and build a network of entities based on the relationships;
a search manager configured to:
receive a search request from the search user, the search user being the starting entity for the network;
search the network of entities to identify a plurality of search results based on the search request, wherein the one or more result entities provide the plurality of search results and the plurality of search results are identified based on the search request;
for the plurality of search results provided by the result entities, determining, from the network, a set of relationships connecting the search user entity to the one or more result entities along one or more paths;
determine, based on the set of relationships connecting the search user entity to the one or more result entities, relevance values for the plurality of search results, wherein the relevance values are determined based on both:
individual similarity components that express relative similarity of individual entities along the one or more paths, and
individual trust components that express relative trust among individual entities along the one or more paths; and
rank the plurality of search results based on the relevance values for the plurality of search results;
a user interface generator configured to present, to the search user, individual search results from the plurality of search results according to the ranking; and
a hardware computer processor configured to execute at least the search manager.

17. A method performed by at least one hardware computer processor, the method comprising:
receiving a search request from a search user;
performing an analysis of the search request to determine a category for the search request;
determining a weighting scheme based on the category, wherein:
the weighting scheme assigns a first numerical value to trust components of relationships among entities,
the weighting scheme assigns a second numerical value that is different than the first numerical value to similarity components of the relationships among the entities, and
the entities include a search user entity and one or more result entities, the search user entity representing the search user;
applying the weighting scheme to the trust components and the similarity components, wherein the applying comprises:
applying the first numerical value to the trust components of the relationships, and
applying the second numerical value that is different than the first numerical value to the similarity components of the relationships;
searching the entities to identify a plurality of search results based on the search request, the plurality of search results being provided by the one or more result entities;
determining a set of relationships connecting the search user entity and the one or more result entities along one or more paths;

determining, based on the set of relationships connecting the search user entity and the one or more result entities, relevance values for the plurality of search results, wherein the relevance values are determined based on both:
  individual similarity components along the one or more paths weighted by the first numerical value, and
  individual trust components along the one or more paths weighted by the second numerical value that is different than the first numerical value;
ranking the plurality of search results based on the relevance values; and
presenting individual search results from the plurality of search results according to the ranking.

18. The method of claim 17 further comprising:
capturing a user selection, the user selection identifying at least one individual search result; and
adjusting at least one of the relationships based on the user selection to create at least one updated relationship.

19. The method of claim 18, wherein the searching comprises crawling a network comprising the entities.

20. The method of claim 19, wherein an individual path connects the search user entity to an individual result entity indirectly via another entity.

* * * * *